United States Patent [19]
Skala et al.

[11] 3,721,417
[45] March 20, 1973

[54] ELASTOMERIC COMBINATION SHOCK AND VIBRATION ISOLATOR

[75] Inventors: Dennis P. Skala; Richard P. Thorn, both of Erie County, Pa.

[73] Assignee: Lord Corporation, Erie, Pa.

[22] Filed: April 9, 1971

[21] Appl. No.: 132,863

[52] U.S. Cl. ............... 248/358 R, 248/24, 267/151
[51] Int. Cl. ............................................. F16f 15/00
[58] Field of Search .......... 248/24, 9, 26, 21, 22, 15, 248/358 R; 267/151, 152, 153

[56] References Cited

UNITED STATES PATENTS

| | | | |
|---|---|---|---|
| 2,380,899 | 7/1945 | Strachovsky | 248/358 R |
| 1,912,451 | 6/1933 | Hibbard | 267/152 X |
| 2,687,269 | 8/1954 | Titus et al. | 248/24 X |
| R23,743 | 11/1953 | Lambert et al. | 248/24 X |
| 2,607,590 | 8/1952 | Wheaton | 248/24 UX |
| 3,144,247 | 8/1964 | Szonn et al. | 248/358 R X |
| 2,649,271 | 8/1953 | Gosselin | 248/24 X |
| 2,275,966 | 3/1942 | Julien | 248/358 R |
| 2,756,016 | 7/1956 | Painter | 248/22 X |

FOREIGN PATENTS OR APPLICATIONS

| | | | |
|---|---|---|---|
| 1,419,768 | 10/1965 | France | 248/24 |
| 885,116 | 12/1961 | Great Britain | 248/358 R |
| 831,733 | 3/1960 | Great Britain | 248/358 R |

*Primary Examiner*—J. Franklin Foss
*Attorney*—James W. Wright

[57] ABSTRACT

An elastomeric mounting capable of both shock and vibration isolation is provided. An elongate elastomeric tubular buckling column, preferably right cylindrical, has one end adapted to be connected to a supporting structure. Means is disposed axially of the buckling column capable of movement axially therewithin for connection to the supporting structure. An elastomeric member is secured between the buckling column and connection means mounting the connection means for resilient movement axially and radially of and within the buckling column with the connection means normally extending axially outwardly of or beyond the other end of the buckling column for normally supporting the supported structure in axially spaced relation to the buckling column. The elastomeric member has a spring rate axially of the buckling column less than the initial axial spring rate of the buckling column.

13 Claims, 6 Drawing Figures

PATENTED MAR 20 1973 3,721,417

INVENTORS
DENNIS P. SKALA
RICHARD P. THORN
BY James W. Wright
ATTORNEY

ELASTOMERIC COMBINATION SHOCK AND VIBRATION ISOLATOR

This invention relates to a resilient mounting for supporting a supported structure relative to a supporting structure and more particularly to an elastomeric mounting capable of both shock and vibration isolation.

Since equipment such as various electronic devices are highly subject to damage as a result of vibration and/or shock, there is a need for mountings capable of isolating such equipment from both vibration and shock. In addition, it is desirable to isolate such equipment by mountings which consume a relatively small space and undergo relatively small deflections.

Vibrations are typically small in amplitude but frequent, usually periodic, in occurrence. Such vibrations may be and have been isolated to a large extent through the use of resilient mountings for supporting the structure to be isolated. In order to provide effective vibration isolation, a resilient mounting should be relatively soft and have a natural frequency in combination with the structure to be isolated substantially less than that of the vibration source. However, the softer the mounting the greater the static deflection thereof. Thus, a practical vibration isolator employs a compromise between deflection characteristics and transmissibility.

Shock on the other hand is typically large in amplitude and infrequent in occurrence. Shock may also be isolated through the use of resilient mountings for supporting the structure to be isolated. For a designed shock load, it is desirable that such a resilient mounting be capable of absorbing large energy levels with a minimum deflection. Thus, the ideal shock isolator would only deflect at a load equal to the designed for shock load and would have a zero springrate at this shock load. Furthermore, such a shock isolator would allow the release of any stored energy at a relatively slow rate. It will be apparent due to the difference in characteristics desirable in shock and vibration isolators, that neither are well suited for both shock and vibration isolation. This is particularly true where the vibration isolator must be relatively soft in order to provide isolation at very low frequencies.

In view of the foregoing, it is an object of the present invention to produce a unitary resilient, elastomeric mounting capable of both shock and vibration isolation.

Another and further object of the present invention is to provide a unitary elastomeric combination shock and vibration isolator which may be formed in a single molding operation and thus, alleviates the need for separate fabrication operations and assemblies subsequent thereto.

Briefly, the objects of the present invention are provided in an elastomeric combination shock and vibration isolator for mounting a supported structure relative to a supporting structure comprising an elongate elastomer tubular buckling column for shock isolation having one end adapted to be connected to the supporting structure. Means such as a rigid sleeve for connection to the supporting structure is disposed axially of the buckling column and is capable of movement axially and radially of and within the buckling column. An elastomer member for vibration isolation is secured, preferably by bonding, between the buckling column and connection means and mounts the connection means for resilient movement axially and radially of the buckling column with the connection means normally extending axially beyond the other end of the buckling column for normally supporting a supported structure in axially spaced relation to the buckling column. The elastomeric member has a spring rate axially of the buckling column less than the threshold or initial spring rate of the buckling column. In the preferred design, both the elastomeric member and buckling column are capable of supporting the static load of the supported structure.

In operation, vibrations are isolated by resilient movement of the elastomeric member relative to the buckling column. Under shock load forcing the supported and supporting structures toward each other, the elastomeric member is resiliently moved axially within the elastomeric column such that the supported structure is cushioned by the buckling column and causes buckling thereof during which time energy of the shock load is absorbed thereby. The buckling column and elastomeric member are normally biased by their inherent resilient properties to a neutral operative position. In the event of a shock tending to displace the supported structure from the supporting structure, a snubbing washer carried by the connecting means inwardly of the buckling column is snubbed by means carried by the buckling column to prevent over extension of the elastomeric member. Lateral shocks are also absorbed by the buckling column.

Some of the objectives of the invention having been stated, other objects will appear as the description proceeds, when taken in connection with the accompanying drawings, in which.

Figure 1:
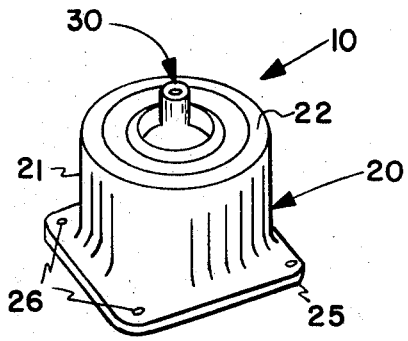
FIG. 1 is a schematic perspective view of an elastomeric combination shock and vibration isolator of the present invention.
Figure 2:
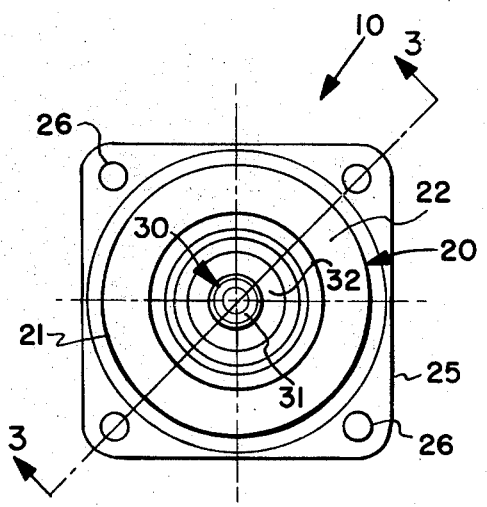
FIG. 2 is an enlarged top plan view of the isolator of FIG. 1.
Figure 3:
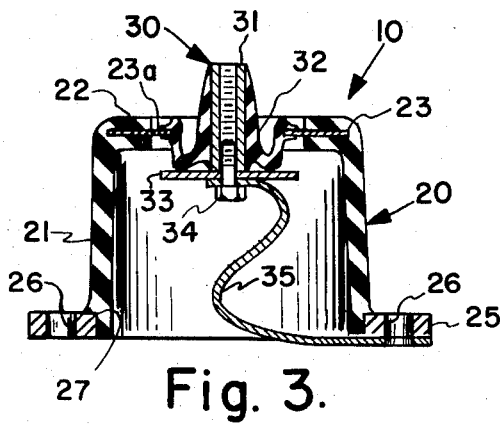
FIG. 3 is a sectional view taken substantially along the line 3—3 of FIG. 2.

Referring more specifically to the various Figures wherein like reference characters are employed to indicate like parts there is illustrated in FIGS. 1-3, an elastomeric combination shock and vibration isolator, generally designated at 10, constructed in accordance with the present invention. As shown, isolator 10 includes in series an elastomeric shock isolator 20 and an elastomeric vibration isolator 30.

The shock isolator 20 comprises an elongate tubular body 21 formed of an elastomer, natural or synthetic. While the tubular body 21 may take on various forms, a right cylindrical form is preferred because of its symmetrical resilient properties. Hereinafter, tubular body 21 will be referred to as a "buckling column" because of its axial load deflection characteristics. When the buckling column 21 is subject to an axial compressive load such load is initially sustained in compression. When the load reaches a threshold, the column 21 buckles, FIG. 5, and continues to do so with substantially no additional loading required until buckling is completed and the load is again taken in compression. During deflection of such a buckling column 21 substantial energy is stored thereby for a given load. Upon removal of the load, the stored energy returns the buckling column 21 to its initial position. Depending on the elastomer utilized, a portion of the stored energy is dissipated and not recovered. To insure that the buckling column 21 functions as described above, the wall of the buckling column 21 in an unloaded condition, FIGS. 1 and 3, should have a length-to-width ratio of at least about two. The use of a buckling column, as will be seen from the foregoing description, has properties approximating that of an ideal shock isolator. It will be understood that the buckling column 21 is designed with its threshold buckling load being substantially equal to the desired maximum shock load.

At one end of buckling column 21 there is an annular elastomeric flange 22 formed integrally therewith extending radially inward thereof. A rigid annular reinforcing plate 23 having an inside diameter less than the inside diameter of buckling column 21 is embedded in and bonded to the flange 22 with a portion 23a thereof projection radially inward of the buckling column 21 from the flange 22.

A rigid attachment plate 25 is bonded to the other end of the buckling column 21 and includes bolt receiving aperatures 26 symmetrically disposed therein to facilitate securement to a supporting structure. As illustrated in FIG. 3, the attachment plate 25 preferably has an aperature 27 disposed therein coincident with the cavity in the buckling column 21 for reasons to be hereinafter apparent.

The vibration isolator 30 is carried centrally of the buckling column 21 adjacent the end thereof remote from attachment plate 25 by the reinforcing plate 23. Vibration isolator 30 comprises an elongate rigid annular sleeve 31 having the inside diameter threaded for threadable receiving bolts from both ends. The outside diameter of sleeve 31 is less than the inside diameter of the reinforcing plate 23. The sleeve 31 is disposed axially of the buckling column 21 adjacent the end remote from attachment plate 25 with at least a portion thereof normally extending axially outwardly of or beyond the buckling column 21.

An annular elastomeric member 32 in the form of a relatively thin membrane encircles the sleeve 31 and is secured, such as by bonding, between the sleeve 31 and reinforcing plate 23. Thus, the elastomeric member 32 is disposed between the sleeve 31 and reinforcing plate 23 in thrust resisting relation to movement of the sleeve 31 axially of the buckling column 21 and mounts the sleeve 31 for resilient movement axially of the buckling column 21. The elastomeric member 32 is preferably bonded to the reinforcing plate 23 with portions thereof on opposite sides of reinforcing plate 23 to provide reinforcement therefor. As best illustrated in FIG. 3, the portion of the elastomeric member 32 between the sleeve 31 and reinforcing plate 23 has a generally U-shaped cross section radially of the buckling column 21 to permit movement of sleeve 31 radially of the buckling column 21. The spring rate of the elastomeric member 32 both axially and radially of the buckling column 21 should be less than the initial axial spring rate and radial spring rate of the buckling column 21 so that the buckling column 21 does not interfere with the action of the elastomeric member 32 in vibration isolation and the proper cooperation therebetween is obtained. This can be accomplished by techniques well known to those skilled in the art.

With reference to FIG. 3, a snubbing washer 33 having an outside diameter greater than the inside diameter of reinforcing plate 23 is detachably secured to the end of the sleeve 31 inwardly of the buckling column 21 by a bolt 34 disposed through washer 33 and threadably received in sleeve 31. Upon movement of sleeve 31 axially away from buckling column 21 a predetermined amount, snubbing washer 33 will be snubbed by the reinforcing plate 23. The aperature 27 in plate 25 provides access to the inside of buckling column 21 and thus, enables assembly of the snubbing washer 33 to the isolator 10. A safety strap or cable 35 may be disposed internally of the buckling column 21 interconnecting, as shown, sleeve 31 and plate 25. Thus, separation of the shock isolator 20 and vibration isolator 30 is prevented in the event the elastomer utilized in the combination shock and vibration isolator 10 should fail.

Figure 4:
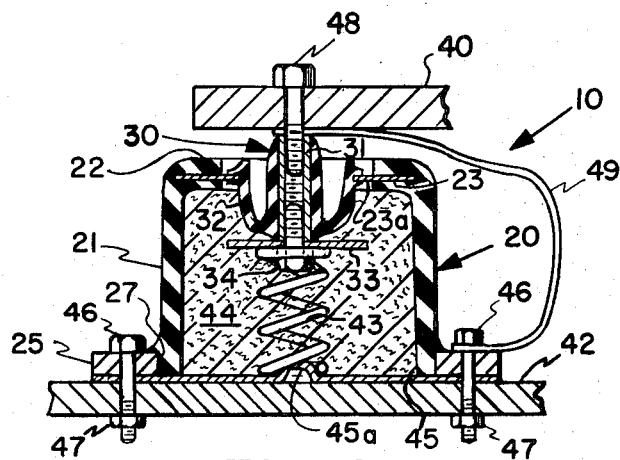
FIG. 4 is a fragmentary sectional view of an elastomeric combination shock and vibration isolator similar to that of FIG. 3 with certain modifications and disposed in operative relation between a supporting and supported structure.
Figure 5:
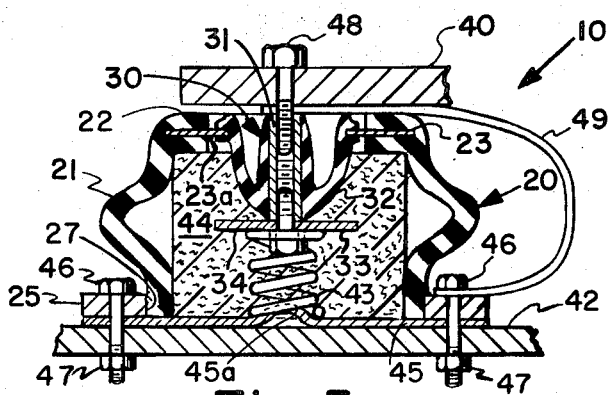
FIGS. 5 and 6 are fragmentary sectional views similar to FIG. 4 illustrating the operation of the isolator during the transmission of shock loads between the supported and supporting structures.
Figure 6:
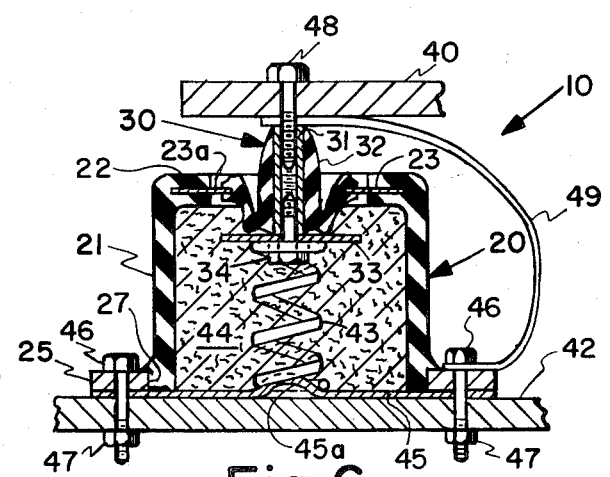

With reference to FIG. 4, there is illustrated the use of a combination shock and vibration isolator 10 similar to that already described with the ommission of the internal safety strap or cable 35 in mounting a supported structure 40 relative to a supporting structure 42. Prior to mounting the isolator 10 between the supported structure 40 and supporting structure 42, an elongate coil spring 43, preferably precompressed, may be positioned within buckling column 21 longitudinally thereof with one end centered over the head of bolt 34 such that the one end abuts snubbing washer 33. The buckling column 21 may also be filled with a load extending or damping material 44 such as a fiber, polymeric foam, metal mesh, or the like with polymeric foam being preferred because of the ease with which it may be disposed in the buckling column 21. To maintain axial alignment of the coil spring 43 and confinement of damping material 44, a confining plate 45 with a centering element 45a for the other end of the coil spring 43 may be disposed over the otherwise open end of the buckling column 21 and suitably held in place such as by securement to plate 25. The isolator 10 is disposed between the supported structure 40 and supporting structure 42. Attachment plate 25 and confining plate 45 are connected to the supporting structure 42 by bolts 46 received through aperatures 26 in plate 25 and mating aperatures in the confining plate 45 and supporting structure 42 and held in place by nuts 47. It will be understood that the bolts 46 could be threadably received in threaded recesses or aperatures in the supporting structure 42. The sleeve 31 is connected to the supported structure 40 by a bolt 48 received through an aperature in supported structure 40 and threadably received in sleeve 31. As will be apparent, the sleeve 31 via the elastomeric member 32, coil spring 43 and damping material 44 supports the static load of the supported structure 40 normally in axially spaced relation to the buckling column 21. In lieu of the internal safety strap or cable 35, an external safety strap 49 may be employed as indicated in FIGS. 4–6. It should be emphasized that the coil spring 43 and load extending or damping material 44 are optional features. Their use will be determined primarily by the performance characteristics desired, the effects of which will be hereinafter more fully described.

Vibrations between the supported and supporting structures are isolated by the combined action of elastomeric member 32, coil spring 43 and damping material 44 both axially and radially of the buckling column 21. During such vibration isolation, buckling column 21 is sufficiently stable so as not to interfere. As will be apparent to those familiar with vibration isolation, both the coil spring 43 and damping material 44 lessen the static deflection of elastomeric member 32 but raise the resonant frequency of the isolator 10. In addition the damping material 44, while decreasing the resonant peak also decreases the vibration isolation obtained at higher frequencies. Thus, if the isolator 10 is to isolate at low frequencies, the coil spring 43 and/or damping material 44 should be eliminated or at least rendered inoperative during vibration isolation.

When one of the structures is subjected to a shock or impact type of loading tending to move the supported structure 40 toward the supporting structure 42 axially, or nearly so, of the buckling column 21, the elastomeric member 32 will be extended and the coil spring 43 further compressed, FIG. 5, to resiliently move the sleeve 31 axially within the buckling column 21 and permit the supported structure 40 to be cushioned by the flange 22 of buckling column 21. If the shock load is in excess of the threshold load of the buckling column 21, the shock load is absorbed primarily by buckling of the buckling column 21 and partially by the damping material 44 and partially dissipated by the damping material 44. During absorption and dissipation of the shock load, the elastomeric member 32 is protected from over extension. Upon removal of the shock load, the absorbed energy in the buckling column 21, elastomeric member 32, coil spring 43 and damping material 44 returns them to their normal operative position, FIG. 4. When the structures are subjected to a shock load tending to separate the supported and supporting structures, axially of the buckling column 21 or during rebound, FIG. 6, the elastomeric member 32 is protected from over extension by snubbing washer 33 which limits the amount of movement of the sleeve 31 axially away from the buckling column 21. Some of such shock load will be absorbed by extension of the buckling column 21. When the structures are subjected to shock loads tending to move them laterally relative to each other, the U-shaped elastomeric member 32 is collapsed such that the shock load is transmitted into and absorbed by the buckling column 21 by lateral deflection. While the vibration isolator 30 is generally equally effective in all directions, the shock isolator 20 is most effective where buckling is induced in the buckling column 21.

While not illustrated as such, the mass of reinforcing plate 23 may be substantially increased to make the isolator 10 a two-mass vibration isolator and thus, enhance the high frequency performance thereof.

The elastomeric combination shock and vibration isolator 10 of the present invention may readily be formed in a single molding operation. The only assembly operations necessary are the securement of the snubbing washer 33 in place and the attachment of the isolator 10 between the supporting and supported structures. However, where the coil spring 43 and damping material 44 are to be utilized additional operations as previously described will be required. Rather than have damping material completely filling the buckling column 21, such material may be disposed solely between the reinforcing plate 23 and snubbing washer 34 or between snubbing washer 34 and the supported structure 42 such that it is only active in vibration isolation. It will also be apparent that the damping material 44 may be disposed in the buckling column 21 such that it is only active in shock isolation.

In the drawing and specification, there has been set forth a preferred embodiment of the invention, and although specific terms are employed, they are used in a generic and descriptive sense only and not for purposes of limitation.

What is claimed is:

1. An elastomeric combination shock and vibration isolator for mounting a supported structure relative to a supporting structure comprising an elongate elastomeric tubular buckling column having one end adapted to be connected to the supporting structure, annular flange means including a rigid annular reinforcing plate carried by the other end of said column and extending radially inwardly thereof, rigid connection means disposed axially of said buckling column adjacent said other end internally of said flange means and having at least a portion thereof normally extending axially beyond said other end of said buckling column and providing means for connection to the supported structure with the supported structure normally supported in axially spaced relation to said buckling column, an annular elastomeric member encircling said connection means and secured between said connection means and the inside of said flange means in thrust resisting relation to movement of said connection means axially of said buckling column for mounting said connection means for resilient movement axially of and within said buckling column, said elastomeric member having a spring rate axially of said buckling column less than the initial spring rate of said buckling column, said buckling column and elastomeric member cooperating with vibrations between the supported and supporting structures of relatively low amplitude being isolated by said elastomeric member and shock loads of relatively high amplitude tending to move the supported and supporting structures relatively toward each other axially of said buckling column resiliently moving said connection means axially within said buckling column to permit the supported structure to be cushioned by said buckling column whereupon such shock loads are received directly by said buckling column and absorbed thereby.

2. An elastomeric combination shock and vibration isolator, as set forth in claim 1, including means carried inwardly of said buckling column by said rigid connection means for snubbing by said annular flange means upon movement of said rigid connection means axially away from said buckling column a predetermined extent to prevent over extension of said elastomeric member.

3. An elastomeric combination shock and vibration isolator, as set forth in claim 1, wherein said annular flange means comprises an annular elastomeric flange formed integrally with said buckling column extending radially inwardly thereof, and a rigid annular reinforcing plate having an inside diameter less than the inside diameter of said flange embedded in and bonded to said flange with a portion thereof projecting radially inward of said buckling column from said flange.

4. An elastomeric combination shock and vibration isolator, as set forth in claim 3, wherein said annular elastomeric member is bonded between said connection means and annular reinforcing plate.

5. An elastomeric combination shock and vibration isolator, as set forth in claim 1, including a flexible safety strap interconnected between said connection means and rigid plate means to prevent separation thereof upon fracture of either of said buckling column and elastomeric member.

6. An elastomeric combination shock and vibration isolator, as set forth in claim 1, including separate damping means disposed internally of said buckling column for providing static load support and energy dissipation upon relative movement between said elastomer member and buckling column.

7. An elastomeric combination shock and vibration isolator, as set forth in claim 1, including separate damping means disposed internally of said buckling column for providing energy absorption and dissipation during buckling of said buckling column.

8. An elastomeric combination shock and vibration isolator, as set forth in claim 7, wherein said damping means comprises a polymeric foam material.

9. An elastomeric combination shock and vibration isolator, as set forth in claim 1, including a polymeric foam material substantially filling said buckling column.

10. An elastomeric combination shock and vibration isolator, as set forth in claim 1, including rigid plate means disposed diametrically of the end of said column adapted to be connected to the supporting structure and coil spring means mounted axially within said buckling column between said rigid plate means and rigid connection means for providing static support to the structure to be supported.

11. An elastomeric combination shock and vibration isolator, as set forth in claim 10, wherein said coil spring is precompressed in a non-load supporting condition.

12. An elastomeric combination shock and vibration isolator, as set forth in claim 1, wherein said annular elastomeric means has a generally U-shaped cross section radially of said buckling column.

13. An elastomeric combination shock and vibration isolator for mounting a supported structure relative to a supporting structure comprising an elongate elastomeric right cylindrical buckling column, the wall of said column when unloaded having a length-to-width ratio of at least two, said column acting in compression under axial thrusts of relatively small force and buckling laterally into flexure under axial thrusts of greater force, said column having at one end an annular elastomeric flange formed integrally therewith extending radially inward thereof, rigid plate means carried by the other end of said column and adapted for mounting said column to the supporting structure, rigid annular reinforcing plate means having an inside diameter less than the inside diameter of said flange embedded in and bonded to said flange with a portion thereof projecting radially inward of said column from said flange, rigid elongate annular sleeve means having an outside diameter less than the inside diameter of said flange disposed axially within said column adjacent said one end with at least a portion thereof normally extending axially beyond said one end and providing means for connection to the supported structure with the supported structure normally supported in axially spaced relation to said one end of said buckling column, an annular elastomeric member encircling said sleeve means and bonded between said sleeve means and said reinforcing plate means in thrust resisting relation to movement of said sleeve means axially of said column for mounting said sleeve means for resilient movement axially of and within said buckling column, said elastomeric member having a spring rate axially of said buckling column less than the threshold compressive spring rate of said buckling column, said buckling column and elastomeric member cooperating with vibrations between the supported and supporting structure of relatively low amplitude being isolated by said elastomeric member and shock loads of relatively high amplitude tending to move the supported and supporting structures relatively toward each other axially of said buckling column resiliently moving said sleeve means axially within said buckling column to permit the supported structure to be cushioned by said buckling column whereupon such shock loads are received directly by said buckling column and absorbed thereby, and means carried inwardly of said buckling column by said sleeve means for snubbing by said reinforcing plate means upon movement of said sleeve means axially away from said buckling column a predetermined extent to prevent over extension of said elastomeric member.

* * * * *